United States Patent [19]

Ricard

[11] 4,012,592
[45] Mar. 15, 1977

[54] AC LINE TRIGGERED REFRESHING OF CRT DISPLAYS

[75] Inventor: Carl A. Ricard, Amherst, N.H.

[73] Assignee: Sanders Associates, Inc., Nashua, N.H.

[22] Filed: May 9, 1975

[21] Appl. No.: 576,399

[52] U.S. Cl. .................. 358/150; 340/324 AD
[51] Int. Cl.² .................. H04N 5/04; G08B 23/00
[58] Field of Search ......... 178/7.5 D, 6.8, 69.5 TV, 178/69.5 G; 340/324 AD

[56] References Cited

UNITED STATES PATENTS

| 3,643,252 | 2/1972 | Roberts, Jr. | 178/7.5 |
|---|---|---|---|
| 3,671,957 | 6/1972 | Kegelman et al. | 340/324 |
| 3,685,039 | 8/1972 | Flanagan | 340/324 |
| 3,750,133 | 7/1973 | Helbig et al. | 178/7.5 |
| 3,803,584 | 4/1974 | Hittel | 178/7.5 |
| 3,916,402 | 10/1975 | Hornung | 340/324 |
| 3,918,039 | 11/1975 | Clark | 340/324 |

*Primary Examiner*—John C. Martin
*Attorney, Agent, or Firm*—Louis Etlinger; Joseph E. Funk

[57] ABSTRACT

The disclosure describes a digitally controlled raster scan display system comprising a video signal generator that is automatically synchronized with the frequency of the a.c. power line from which it is powered to prevent line frequency beating. The display system also comprises a raster scan display generating a video display in response to signals from the video signal generator while needing no synchronizing circuits such as a phase lock loop.

10 Claims, 2 Drawing Figures

FIG. 1

AC LINE TRIGGERED REFRESHING OF CRT DISPLAYS

FIELD OF THE INVENTION

This invention relates to raster scan video display systems and more particularly to synchronizing circuits therein.

BACKGROUND OF THE INVENTION

In the raster scan display art it is well known to keep the vertical and horizontal sweep oscillators of a display in phase synchronization with signal generating components of a video signal generator. In the United States television equipment and raster scan video display terminals function in synchronization with the 60 hertz commercial power to eliminate the problem known in the art as "line frequency beating" evidenced by a vertical waviness in a video display. Typically, a horizontal sweep oscillator of television receivers and displays oscillate at 15.75 kilohertz and the vertical sweep oscillator oscillates at 60 hertz. In television transmitting stations crystal oscillators are generally used to generate the vertical and horizontal synchronization signals that are used to conrtol the horizontal and vertical deflection signal generators. Synchronization of a display or receiver with video signal synchronization signals is accomplished by frequency comparator circuits which are utilized to compare the frequency of local vertical and horizontal oscillators circuits with the synchronization pulses of the video signal input to the display or receiver. The most widely used frequency comparator circuit is a phase lock loop circuit.

In the prior art, the vertical and horizontal oscillators of raster scan displays have been designed to operate at a given frequency synchronous with harmonics of the public utility power line to prevent line frequency beating and cannot operate other power line frequencies. In Great Britain and other countries the power line frequency is 50 hertz (hz), while in the United States the power line frequency is 60 hz. In the prior art displays designed to operate synchronously with both power line frequencies had to have their sweep oscillator circuit configurations manually or automatically changed to change the frequency of oscillation thereof. U.S. Pat. No. 3,129,390 issued Apr. 14, 1964 to R. C. March et al discloses a switch used to change the circuit configuration of the sweep oscillators of the raster scan display.

It is an object of this invention to provide a new and improved raster scan display that does not require a frequency comparator circuit for locking the frequency of the vertical and horizontal sweep oscillators to the synchronization pulses of a video signal.

It is another object of this invention to provide a new and improved raster scan display that can operate synchronously with different public utility power line frequencies without changing the frequency of operation of the sweep oscillators.

It is a further object of this invention to provide a new and improved raster scan display that will not "beat" against the public utility power line resulting in a distorted display.

SUMMARY OF THE INVENTION

In the preferred embodiment of my invention disclosed herein an oscillator applies pulses to a binary counter that counts and divides the output from the oscillator. One output of the binary counter is used to control the generation of horizontal sweep and blanking by other circuitry. The output of other stages of the counter are used to control generation of vertical sweep and blanking signals. Other states of the counter are used to divide the display screen into rows of characters, divide each row of characters into character blocks within each of which can be displayed a character, and further divide each character block into rows and columns of elemental spaces which are selectively illuminated by the scanning beam of the raster display to display a character. Other apparatus is provided that is responsive to outputs of the counter to generate video signals used to display symbols in the character blocks.

In accordance with a feature of the invention I provide one-shot ramp waveform signal generators in the display device to generate the horizontal and vertical deflection signals required to produce a raster scan on the display device. The slope of the vertical and horizontal ramp deflection signals is held constant and is not changed as the frequency of the power input to the display device is changed. Thus, the scanning beam sweeps the display at a fixed rate. Once a single ramp deflection signal is output from the vertical and horizontal ramp generators they do not generate another ramp deflection signal until they are retriggered by a subsequent vertical or horizontal synchronization pulse in the composite video signal input to the display. To assure that no power line "beating" occurs the oscillator driven binary counter is reset once per cycle of the public utility power, whatever the frequency may be. This causes vertical synchronization signals and thus vertical retrace to occur in synchronization with the public utility power to eliminate beating. To assure that an entire frame may be displayed on the display device, regardless of the frequency of the public utility power, the slope of the vertical deflection signal generated by the vertical ramp generator is such that the scanning beam of the display device vertically scans the display device in less than the period of a cycle of any frequency public utility power that may be applied to the display device. The scanning beam scans the entire display area and then remains off screen until the one-shot vertical ramp generator is triggered to generate the next vertical ramp deflection signal. The lower the frequency of the public utility power the longer the scanning beam will remain off screen following one complete trace of the display device before the binary counter is reset and thereby causes the vertical ramp generator to generate another ramp deflection signal. For higher frequency public utility power the scanning beam will remain off screen following a complete trace for a shorter period of time. The time period for the scanning beam to scan a single frame on the display device remains constant but the frequency of tracing successive frames is dependent on the frequency of the public utility power input to the display device. Thus, the difference in the period of each cycle of different frequency public utility power is accounted for and "beating" is eliminated.

It is apparent from the foregoing description of operation of a display device equipped with apparatus in accordance with the preferred embodiment of my invention, that frequency comparator circuits such as a phase lock loop circuit for synchronizing vertical and horizontal sweep oscillators with synchronization signals is not required. In addition, it is apparent that the circuitry in the display device must not be manually or automatically changed with a change in power line frequency in order for the display device to function properly.

BRIEF DESCRIPTION OF THE DRAWINGS

The foregoing objects and other objects, features, and advantages of my invention become apparent by reference to the following detailed description when read in conjunction with the accompanying drawing in which.

DETAILED DESCRIPTION

Figure 1:
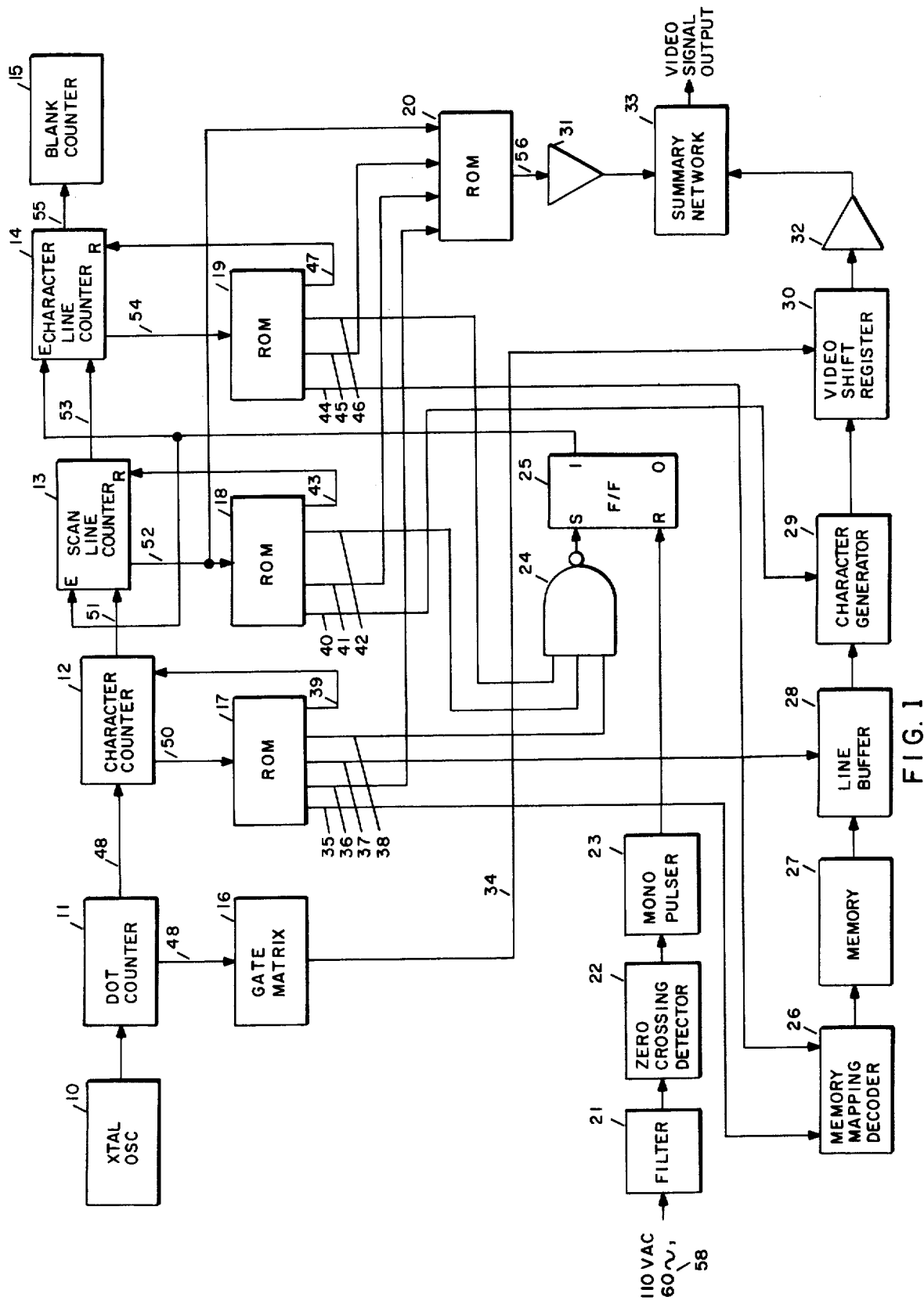
FIG. 1 is a detailed block diagram of display equipment incorporating the preferred embodiment of my invention to generate a video signal for my display system.

Referring now to FIG. 1, therein is shown a detailed block diagram of a circuit for generating video signals which, when applied to a raster scan display, will display alpha-numeric or other symbols on the screen of the display. The timing functions of the video signal generator shown in FIG. 1 are generated by crystal oscillator 10 and a binary counter made up of dot counter 11, character counter 12, scan line counter 13, character line counter 14, and block blank counter 15. These counters are used to divide the display screen of a raster scan display into a multiplicity of rows of character blocks in each of which a symbol may be displayed. In addition, each character block is subdivided into rows and columns of elemental spaces which are selectively illuminated to display a symbol. Gate matrix 16, read only memory (ROM) 17, ROM 18, ROM 19, are responsive to the contents of counters 11, 12, 13, and 14 to which they are connected to decode the count and provide the timing signals required to generate a standard composite video signal comprising character display information and vertical and horizontal blanking and synchronization signals.

I also provide a character generator for generating video signals of the alpha-numeric information and symbols to be displayed on the display area of a raster scan display. This character generator is made up of memory mapping decoder 26, memory 27, line buffer 28, character generator 29, and video shift register 30 all of which cooperative in a manner well known in the art but are described in greater detail hereinafter. I also provide filter 21, zero crossing detector 22, monopulser 23, and flip-flop 25 which, in accordance with the teaching of my invention are used to control counters 12, 13 and 14 once per cycle of the alternating current (a.c) public utility power line or other source providing power to my raster scan display in order to operate my raster scan display in synchronization with the power line and thereby eliminate line frequency beating.

Crystal oscillator 10 in the video signal generator of FIG. 1 is the one signal source from which all timing functions of the video generators are derived. Oscillator 10 drives the binary counter made up of counters 11, 12, 13, 14 and 15. Counter 11 is the lowest order stage at the binary counter and provides an output on lead 48 when subdivides a character block into columns of elemental spaces. Gate matrix 16 is responsive to the output from counter 11 on lead 48 to provide a pulse train output on lead 34. These pulses are referred to in the art as dot pulses and there is one dot pulses generated for each elemental space scanned by the scanning beam of the display device. Output lead 34 from matrix 16 applies the dot pulses to video shift register 30 of the character generator. The dot pulses applied to video shift register 30 cause a video signal to be generated in direct synchronization with the scanning beam of the display device as will be discussed in greater detail further in this specification.

Dot counter 11 also provides an output which is connected via lead 49 to the lowest order counting stage of character counter 12. The binary count in character counter 12 indicates which character block in a row of character blocks is presently being scanned on the display device. As the scanning beam of the display device finishes scanning one scan of a row of character blocks there is a pulse output from counter 12 on lead 51. The binary count in character counter 12 is also output on lead 50 to ROM 17 which is programmed to provide outputs on its output leads 35, 36, 37, 38 and 39 which are described now and further in the specification. The output from ROM 17 on lead 35 is input to memory mapping decoder 26 of the character generator and indicates when the scanning of the display device has finished scanning the last character block on one scan line. When the binary count in counter 12 indicates completion of each scan line on the display screen there is an output from ROM 17 on lead 36 used to initiate generation of horizontal blanking and synchronization signals by ROM 20 as described further in the specification. The output from ROM 17 on lead 37, an input to line buffer 28 indicates to buffer 28 which character blocks in a row of character blocks are bing scanned to allow characters shifting by the character generator. Th output from ROM 17 on lead 38 is applied to one of the three inputs of NAND gate 24 and indicates completion of each scan line on the display screen. The output from ROM 17 on output lead 39 is said to rest input R of character counter 12 and causes character counter 12 to be reset to a starting state concurrent with the initiation of each horizontal synchronization signal. Character counter 12 then recounts keeping track of which character of a row of characters is being scanned on the next succeeding scan of the raster.

As mentioned previously, the output from character counter 12 on lead 51 indicates when the scanning beam of the display device has completed one horizontal scan and causes scan line counter 13 to be incremented thereby indicating that the next scan line of the display device is being traced by the scanning beam of the display device.

The outputs from scan line counter 13 on leads 52 are input to ROM 18 which decodes the contents of counter 13 and provides outputs on leads 40, 41 and 42 also used in timing circuit functions in the video signal generator shown in FIG. 1. There is a signal applied to output leads 40 by ROM 18 indicating which scan line of a row of characters is being displayed. The signal on leads 40 is input to character generator 29 which cooperates with video shift register 30, as detailed further in the specification, to generate the video signal for the particular scan line of a character presently being scanned by the scanning beam of the display device. There is a signal applied to lead 41 by ROM 18 upon completion of scanning of all scan lines for a row of character blocks. The signal on lead 41 is input to ROM 20 and is used to initiate the generation of a vertical blanking and synchronization signal at the proper time.

ROM 18 also applies a signal to lead 42 that is input to NAND gate 24 indicating the end of scanning of each character line. The function of NAND gate 24 is described further in the specification. ROM 18 also applies a signal to lead 43 which is applied to the reset input R of scan line counter 13 after the last scan line of a row of character blocks has been scanned. This signal applied to input R of counter 13 resets scan line counter 13 to an initial count so that counter 13 may count the scan lines for the next row of character blocks to be displayed on the display device. There is an output from the highest order stage of scan line counter 13 on lead 53 which also indicates when the last scan line of a row of character blocks has been scanned. The pulse on lead 53 is input to character line counter 14 to increment counter 14 so that the binary count therein is indicative of the next row of character blocks on the display device to be scanned by the scanning beam. The binary counter stages of counter 14 are connected via leads 54 to ROM 19 which decodes the contents of counter 14 and provides a timing output signal on leads 44, 45, 46 and 47. When the last row of character blocks on the display device has been completely scanned and character line counter 14 is again incremented by counter 13, ROM 19 applies a signal to lead 44 that is input to memory mapping decoder 26 which causes the next row of character blocks to be displayed as described further in the specification. ROM 19 applies a signal to lead 45 following completion of scanning of the last row of character blocks displayed on the display device. The signal is input to ROM 20 to initiate the generation of the vertical blanking and synchronization signals. ROM 19 also applies a signal to lead 46 that is input to NAND gate 24 indicating that the last scan line on the screen of display device has been scaned and, as will be described in greater detail further in the specification, causes scan line counter 13 and character line counter 14 to cease counting. Finally, ROM 19 applies a signal to lead 47 which is applied to reset input R of character line counter 14 to reset counter 14 to an initial count. This prepares a counter 14 to count the character blocks scanned on the next succeeding vertical trace of the display device screen.

When the count in line counter 14 indicates that the last scan line has been scanned during one vertical trace an output signal is applied to lead 55 which is input to field counter 15. Field counter 15 is a single stage counter whose binary content changes between its 0 and 1 state on odd and even interlaced scan fields respectively. The generation of interlaced fields is well known in the art and is not described here. Accordingly, no output is shown from field counter 15.

In summary, crystal oscillator 10 and counters 11, 12, 13, 14 and 15 cooperate to provide binary signal outputs used to control all functions of the video signal generator shown in FIG. 1. Binary count in the counter comprising counters 11, 12, 13, 14 and is are decoded by gate matrix 16 and ROM's 17, 18 and 19 provide the exact control signals required by the video signal generator.

In accordance with the teaching of my invention, I do not try to synchronize the frequency of crystal oscillator 10 with the frequency of the public power. Instead, oscillator 10 causes a predetermined binary count of character line counter 14 to indicate that all character lines displayed on the display device have been completely scanned by one vertical scan of the scanning beam of the display device in a time period that is less than the period of any possible frequency of public utility power with which the display device may be powered. The predetermined binary count is sensed by ROM 19 which provides an output via lead 46 to one of the three inputs of NAND gate 24. In addition, when the binary count in scan line counter 13 indicates that the last scan line of the last character line has been scanned, its associated ROM 18 provides an output via lead 42 to the second input of NAND gate 24. Finally, when the binary count in character counter 12 indicates that the last character of a line has been scanned by its associated ROM 17 provides an output via lead 38 to the third input of NAND gate 24. Thus, all three inputs of NAND gate 24 are energized when the scanning beam has finished a complete scan of the display device. At that time there is an output from NAND gate 24 which energizes set input S of flip flop 25 causing the flip flop to be placed in its 1 state. With flip flop 25 being in its 1 state there is a signal output therefrom via lead 71 which is applied to the enable input E of both scan line counter 13 and character line counter 14 causing these counters to cease counting. Counters 11 and 12, however, are allowed to continue counting. As will now be described, flip flop 25 is returned to its zero state to reenable scan line counter 13 and character line counter 14 in direct synchronization with a frequency of the public utility power line from which the display device is powered. Counters 13 and 14 then cause generation of a vertical blanking and synchronization signal.

In this embodiment of my invention my video signal generator is powered by 110 volts a.c. 60 Hz source 58. However, in accordance with the teaching of my invention, the frequency of the public utility power line may just as well be 50 Hz which is found in many countries of the world. The public utility power line source 58 is applied to filter 21, which is advantageously a low voltage winding of a power transformer in a power supply (not shown) powering my video signal generator. The output of filter 21 is a low voltage a.c. signal of the same frequency as the public utility power line which is input to zero crossing detector 22. As is well known in the art, a zero crossing detector 22 provides an output signal once per cycle of the public utility power line. Monopulser 23 is responsive to each output signal from detector 22 to generate a shaped pulse which is applied to reset input R of flip flop 25. In accordance with the teaching of my invention monopulser 23 applies a pulse to reset input R of flip flop 25 several microseconds after flip flop 25 has been placed in its one state causing counters 13 and 14 to cease counting. The time difference between flip-flop 25 being placed in its one state and being reset to its zero state is longer when the public utility power line has a frequency of 50 Hz than when power line frequency is 60 Hz as is recognizable to one skilled in the art. When flip flop 25 is returned to its zero state, once per cycle of the power line, counters 13 and 14 are reenable to count from the last binary count. When character counter 12 indicates the scanning beam has finished a horizontal sweep it applies a signal via lead 51 which increments the count is scan line counter 13 which then causes character line counter 14 to be incremented. The higher binary count in counters 12, 13 and 14 is sensed by ROM's 17, 18 and 19, respectively. ROM 17 applies a signal via lead 39 to reset input R of counter 12 returning it to a start count state. ROM 18 applies a signal via lead 43 to reset input R of counter 13 resetting it to a start count state. ROM 19 applies a signal via lead 19 to reset input R of character line counter 14 returning it to its start count state. In this manner, scan line counter 13 and character line counter 14 are effectively synchronized with the frequency of the public utility power line powering the display device and line frequency beating seen on the display device is eliminated.

Before describing the generation of video signals for the display of alpha-numeric information or symbols on the display device I first describe the generation of horizontal and vertical synchronization signals. As previously described, ROM 17 is responsive to the count in counter 12 to provide a signal on lead 36 indicating when the last possible character space in a character line on the display device has been scanned by a single scan line. At this time the scanning beam is deflected off-screen and does not commence another horizontal scan until horizontal blanking and sync signals are generated. The aforementioned signals output on lead 36 from ROM 17 causes ROM 20 to generate the horizontal blanking and sync signals on its output lead 56 to be amplified by amplifier 31 and mixed with the remainder of the video signal by network 33 as is described in greater detail further in the specification. More particularly, the binary count of character counter 12 is incremented several more counts in direct correspondence with the scanning beam sweeping from the last displayed character in a line of characters to an off-screen position. This higher binary count of counter 12 is sensed by ROM 17 which then applies the signals to lead 36 to be input to ROM 20.

Upon being incremented to a still higher count than that to initiate generation of the horizontal blanking and sync signals ROM 17 applies a signal via lead 39 to reset input R of counter 12 causing it to be reset to its start count. Character counter 12 then recounts in synchronization with the next horizontal scan of the display device.

Generation of vertical blanking synchronization signals is controlled by the binary count in scan line counter 13 and character line counter 14. It is well known in the art to provide a buffer space at the bottom of the screen of the display device below the last line of characters displayed on the screen. Following the last counter line of characters displayed on the screen, scan line counter 13 and character line counter 14 continue to count until character line counter 14 is incremented a few more counts indicative of the scanning beam of the display device having finished scanning vertically to an off screen position. At this time, the binary counts in character counter 12, scan line counter 13 and character line counter 14 indicate that the scanning beam is at the lower right hand corner of the screen in an off screen position. Output leads 38, 42 and 46 of ROM's 17, 18 and 19 respectively are all energized resulting in an output from NAND gate 24 thereby causing flip flop 25 to be placed in its one state as described previously. Also, as previously described, flip flop 25 being in its one state causes a signal to be applied via lead 71 to enable input E of counters 13 and 14 resulting in these counters being disabled from counting until flip flop 25 is reset to its zero state.

Upon flip flop 25 being reset to its zero state as described previously, scan line counter 13 and character line counter 14 commence counting from their last binary count. Both counters 13 and 14 are incremented after being reenabled and the incremented counts therein are detected respectively by ROM's 18 and 19. At this time ROM 18 applies a signal via lead 41 to ROM 20 and ROM 19 applies a signal via lead 45 to ROM 20. There is also an input to ROM 20 directly from scan line counter 13 via lead 72 which also has a signal thereupon. With these signals present on leads 41, 45 and 72 and input to ROM 20, the ROM is programmed to output a vertical blanking and synchronization signal on lead 56 which is amplified to an appropriate level by amplifier 31. The amplified blanking and synchronization signal is then input to summing networks 33 where it is mixed with the video display signal to create a composite video signal that is output from network 33 to drive a raster scan display (FIG.2) which is described further in the specification.

Turning now to describe the generation of video signals for the display of alpha-numeric or other symbols. The video signal generator apparatus comprises memory mapping decoder 26, memory 27, line buffer 28, character generator 29, video shift register 30, and amplifier 32. Elements 26, 27, 28, 29, 30 and 32 cooperate in a way that is well known in the art to generate video signals for the display of alpha-numeric information on a display device, so video signal generator is not described in great detail herein. The video signal generator apparatus is under control of the counters and associated decoding ROM's described heretofore to display information at the proper positions on the screen of the display device. Memory mapping decoder 26 has two inputs thereto. The first input is from ROM 17 via lead 35 which indicates the end of scanning of each scan line. The second input is provided by ROM 19 via lead 44 and indicates when each line of characters has been completely scanned during either an odd or even interlaced field. At the end of scanning of the last scan line of a complete line of characters on the display device the signals on these two inputs via leads 35 and 44 to memory mapping decoder 26 causing coded information to be read out from membory 27 indicating the next succeeding line of characters to be displayed on the display device. This coded information is stored in line buffer 28 prior to commencement of scanning of the particular line of characters. Line buffer 28 has a second input thereto from ROM 17 via lead 37 indicating which character is presently being scanned by the scanning beam of the display device. The signal on lead 37 causes an ASCII coded signal representing the character to be scanned to be input to character generator 29. As is well known in the art, character generator 29 may comprise a commercially available integrated circuit which is preprogrammed for the alpha-numeric or other symbols to be displayed. Character generator 29 has another input via lead 40 from ROM 18 indicating which scan line is being scanned for a row of characters. In response to these inputs via leads 37 and 40, character generator 29 provides an output in parallel format to video shift register 30 at the beginning of each scan line of each character. The output from generator 29 indicates which elemental spaces along the particular scan line are to be illuminated in order to properly display a character. Video shift register 30 has an input thereto via lead 34 from gate matrix 16. This signal on lead 34 is a stream of pulses synchronous with the scanning beam scanning each elemental space or dot on the face of the display device. These dot pulses cause the contents of register to be shifted out in serial formate to make up the video signal. The video signal output from video shift register 30 is amplified by amplifier 32 and input to summing network 33 where it is mixed with vertical and horizontal blanking and synchronization signals in a manner well known in the art to create a composite video signal.

Figure 2:
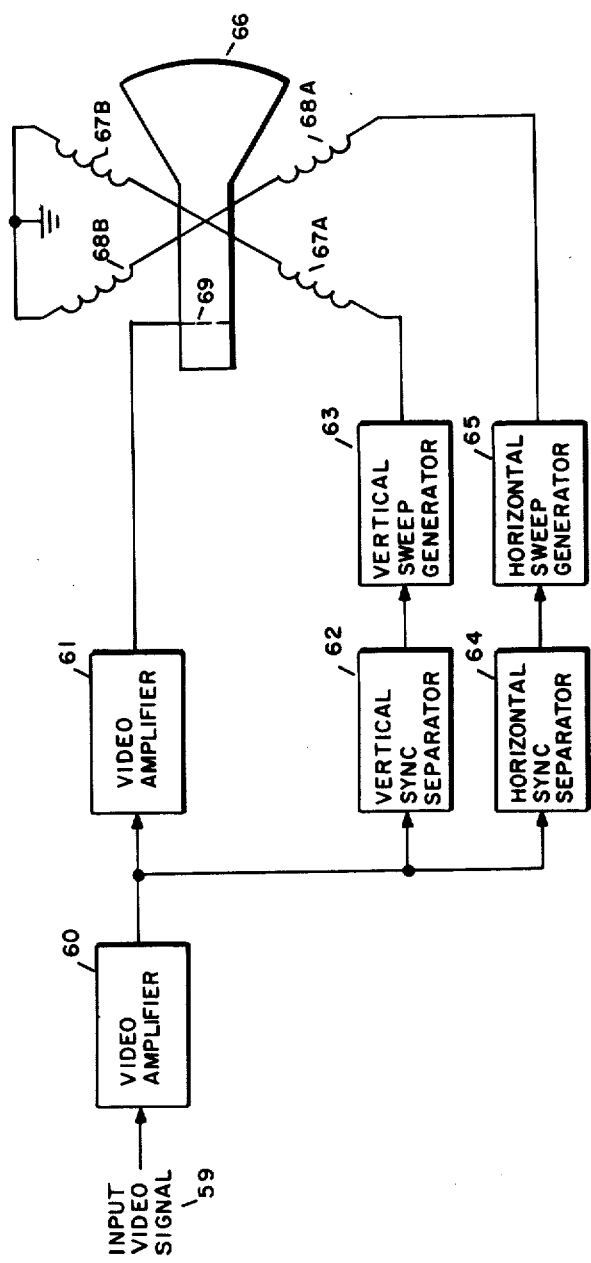
FIG. 2 is a block diagram of a cathode ray tube (CRT) display in accordance with the preferred embodiment of my invention.

Turning now to FIG. 2, therein is shown a block diagram of a CRT display used to display alphanumeric or other symbol information in response to the composite video signal generated by the video signal generator of FIG. 1 applied to input 59 of the display. The video signal at input 59 is amplified by video amplifier 60 and, in a well known manner, vertical sync separator 62 separates vertical sync pulses from the video signal and horizontal sync separator 64 separates horizontal sync pulses from the video signal. The video signal is further amplified by video amplifier 61 and applied to control grid 69 of cathode ray tube 66 to modulate the scanning beam of tube 66.

In accordance with the teaching of my invention, vertical and horizontal sweep oscillators and phase lock loop circuitry are not provided. Instead, vertical sweep generator 63 and horizontal sweep generator 65 are one-shot ramp generators and are used to provide ramp deflections signals. Horizontal ramp deflection signals generated by generator 65 are applied to magnetic deflection coils 68a and 68b around the neck of cathode ray tube 66 and vertical ramp deflection signals generated by generators 63 are applied to deflection coils 67a and 67b. Horizontal sweep generator 65 generates one ramp signal at a time and each ramp signal causes the scanning beam to sweep across the face of CRT 66 and remain off screen at full deflection until another horizontal sync pulse is detected by sync separator 64. In response to a subsequent horizontal sync pulse, sync separator 64 generates a signal causing horizontal sweep generator 65 to generate another ramp deflection signal.

Vertical sync separator 62 and vertical sweep generator 63 operate in the same manner as previously described for horizontal sync separator 64 and horizontal sweep generator 65. The ramp deflection signal generated by vertical sweep generator 63 causes the scanning beam of CRT 66 to vertically sweep the display area of CRT 66 in a time period less than the period of any possible frequency of public utility power that may be used to power the display. Typically, the frequency of the public utility power will only be either 50 Hz or 60 Hz. The period of 50 Hz power is 20 milliseconds while the period of 60 Hz power is approximately 17 milliseconds and the slope of the vertical deflection signal generated by sweep generator 63 causes the scanning beam of CRT 66 to scan the face thereof in 15 milliseconds. After a complete vertical scan the beam remains off screen until another vertical sync pulse is detected by sync separator 62 which then triggers sweep generator 63 to generate another vertical ramp deflection signal. As the sync pulses are generated in response to the public utility power the scanning beam of CRT 66 operates in synchronization with the public utility power providing power to the display device and line frequency beating is eliminated without the use of synchronization circuits such as phase lock loop circuits.

It is apparent that various modifications may be made to my invention without departing from the spirit and scope of the invention.

What I claimed is:

1. A display system for displaying symbols on a display device that exhibits a scan-line raster, said display system including a circuit for controlling the generation of signals for the display of symbols in defined character block on said device comprising
   means for generating a plurality of pulses,
   means for counting said pulses,
   decoder means responsive to the count in said counting means to define the scan line raster and to divide said blocks into rows and columns of elemental spaces selectively illuminated to dislay symbols in said blocks, said decoder means disabling said counter from counting further upon a predetermined count being in said counter indicating a complete raster scan on said display device,
   means for periodically reenabling said counter to count in response to said pulses, the reenabling of said counter resulting in another complete raster scan on said display device.

2. The display system in accordance with claim 1 wherein said counting means comprises a first plurality and a second plurality of counter stages and said decoder disables said second plurality of counter states from counting upon said predetermined count being therein.

3. The display system in accordance with claim 2 wherein said counter reenabling means comprises a latching circuit which is placed in a first state by said decoder,
   said latching means is periodically placed in a second state, and said second plurality of counter means is responsive to said latching means being in said first state to be disabled from counting and is responsive to said latching means being said second state to be enabled to count.

4. A display system for displaying characters on a display device that exhibits a scan-line raster and wherein each character is displayed in one character block on said display device, said display system including a character generator generating signals for the display of characters on said display device, and a circuit for controlling the operation of said character generator comprising
   a first counter driven by a pulse train,
   a second counter driven by said first counter,
   decoder means responsive to the count in said first and said second counters for controlling the operation of said character generator, said decoder means generating a first signal upon a predetermined count being in said first and said second counter indicating a complete raster scan on said display device, and
   latching means being placed in a first state responsive to said first signal generated by said decoder means, said second counter being disabled from counting responsive to said latching means being in said first state, and said disabled second counter preventing a subsequent complete raster scan on said display device.

5. The display system in accordance with claim 4 further comprising means for generating a second signal in response to each cycle of an alternating current power source providing power to said display system, said latching means being responsive to said second signal to be placed in a second state thereby reenabling said second counter to count.

6. The display system in accordance with claim 5 wherein said decoder is responsive to a first predetermined count in said first and said second counters following reenabling of said second counter to generate a third signal, said second counter being reset to a second predetermined count in response to said forth signal.

7. A display system for displaying characters comprising
a display device that exhibits a scan-line raster and wherein each character is displayed in a character block on said device,
a character generator generating signals for the display of characters on said display device, and
a circuit for controlling the operation of said display system comprising
an oscillator
a first binary counter being driven by said oscillator
a second binary counter being driven by said first counter, said second counter counting from a first predetermined count,
decoder means responsive to the count in said first and second counters to define the scan line raster and to divide said character blocks into rows and columns of elemental spaces selectively illuminated to display characters therein, said decoder controlling said character generator and generating a first signal upon a second predetermined count being in said first and second counters,
a latching circuit having a first and a second state, said latching circuit being placed in said first state responsive to said first signal, said second counter being disabled from counting responsive to said latching circuit being in said first state, said disabled second counter preventing a subsequent complete raster scan on said display device, said
means for generating a second signal in response to each cycle of an alternating current power source providing power to said display system said second signal causing said latching means to switch to said second state and thereby reenable said second counter to count, and said decoder being responsive to a third predetermined count in said second counter to generate a third signal causing said second counter to be reset to said first predetermined count.

8. The display system in accordance with claim 7 further comprising means controlled by said decoder means for generating horizontal and vertical synchronization signals, and means for mixing said character signals generated by said character generator and said horizontal and said vertical synchronization signals into a video signal.

9. The display system in accordance with claim 8 wherein said display device comprises a one-shot ramp horizontal deflection signal generator generating one horizontal deflection signal in response to each horizontal synchronization signal in said video signal, and a one-shot ramp vertical deflection signal generator generating one vertical deflection signal in response to each vertical synchronization signal in said video signal.

10. A method for synchronizing a display signal generated by a video signal generator for a raster scan display device with the frequency of an alternating current power source powering said video signal generator and said device comprising the steps of
generating control signals using an oscillator driven binary counter the contents of which are decoded by a decoder to provide said control signals,
generating a video signal including synchronization pulses responsive to said control signals,
interrupting the counting sequence of said counter responsive to a predetermined count in said counter,
generating a pulse in response to each cycle of said power source, enabling said counter to continue its counting sequence responsive to said pulse, and
generating each raster scan sweep signal for said display device in response to each synchronization pulse in said video signal.

* * * * *